United States Patent
Poncelet et al.

(10) Patent No.: US 6,555,008 B1
(45) Date of Patent: Apr. 29, 2003

(54) METHOD TO EXTRACT SILVER FROM A PHOTOGRAPHIC DEVELOPER

(75) Inventors: Olivier J. Poncelet, Chalon sur Saone (FR); Jacques Roussilhe, Virey le Grand (FR); Danielle M. Wettling, Chatenoy le Royal (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/049,382
(22) PCT Filed: Aug. 25, 2000
(86) PCT No.: PCT/EP00/08291
§ 371 (c)(1), (2), (4) Date: Feb. 11, 2002
(87) PCT Pub. No.: WO01/18602
PCT Pub. Date: Mar. 15, 2002

(30) Foreign Application Priority Data

Sep. 6, 1999 (FR) .............................. 99 11246

(51) Int. Cl.$^7$ .............................................. C02F 1/42
(52) U.S. Cl. ...................................................... 210/688
(58) Field of Search .......................................... 210/688

(56) References Cited

U.S. PATENT DOCUMENTS

| 4,508,838 A | 4/1985 | Buckl |
| 5,792,793 A | 8/1998 | Oda et al. |

FOREIGN PATENT DOCUMENTS

| EP | 0 789 271 A1 | 8/1997 |
| EP | 0 937 393 A1 | 8/1999 |

OTHER PUBLICATIONS

JP 62115447—Abstract.
Pine et al., Organic Chemistry, 4th ed., McGraw–Hill Book Company, 1980, p.28, defining "functional groups.".*

* cited by examiner

Primary Examiner—Chester T. Barry
(74) Attorney, Agent, or Firm—Chris P. Konkol

(57) ABSTRACT

This invention concerns the developing of silver halide photographic products. Silver-laden slurries accumulate in developing baths. It is possible to eliminate these silver-laden slurries by placing the developing baths in contact with aluminosilicate polymers modified by sulfur groups. For example, a tank 12 is fitted with a loop to feed the bath through a cartridge 16 that contains the elements 18 that are permeable to the developing bath, and which contain the aluminosilicate polymer modified by the sulfur groups.

10 Claims, 1 Drawing Sheet

METHOD TO EXTRACT SILVER FROM A PHOTOGRAPHIC DEVELOPER

FIELD OF THE INVENTION

This invention concerns a method for the removal of silver contained in an used photographic silver halide developer.

BACKGROUND OF THE INVENTION

In the photographic industry silver halide films (and papers) are processed after exposure in several treatment baths, in particular at least one developing bath. Such processing methods are well known (see for example Chimie et Physique Photographiques, P. Glafkidès, Vol Chapter XL pages 947–967, 5$^{th}$ edition, 1987). One known problem met in the development of silver halide photographic films is the accumulation metallic silver in the forme of silver-laden slurries in the developing bath. This accumulation of silver-laden slurries results in silver deposits adhering to tank walls, conveyor rollers and all the parts of the processing line. These silver deposits require more frequent maintenance and cleaning operations. Also, the presence of silver-laden slurries in the developing bath reduces the useful life of the developer. Lastly, the silver-laden slurries can be deposited on the processed film, where they form black spots or fogging, which may spoil the developed image.

It is therefore desirable to be able to extract these silver-laden slurries and recover the silver in them. Silver recovery may be economically worthwhile, and is becoming mandatory with the increasingly strict current standards for effluent disposal.

SUMMARY OF THE INVENTION

The object of this invention is therefore a method to extract the metallic silver contained in a developer for photographic silver halides, comprising the step of placing the developer in contact with an aluminosilicate polymer having surface organic radicals with functions, selected in the class consisting of SH and —S(CH$_2$)$_n$S— functions, where n is an integer from 1 to 4 inclusive.

A further object of this invention is a product to extract silver from a photographic developer, comprising (i) an aluminosilicate polymer bearing organic radicals on its surface with functions, selected in the class of SH and —S(CH$_2$)$_n$S— functions where n is a integer from 1 to 4 inclusive, and (ii) a complexing agent that is released into the photographic developer.

DETAILED DESCRIPTION OF THE INVENTION

Figure 1:
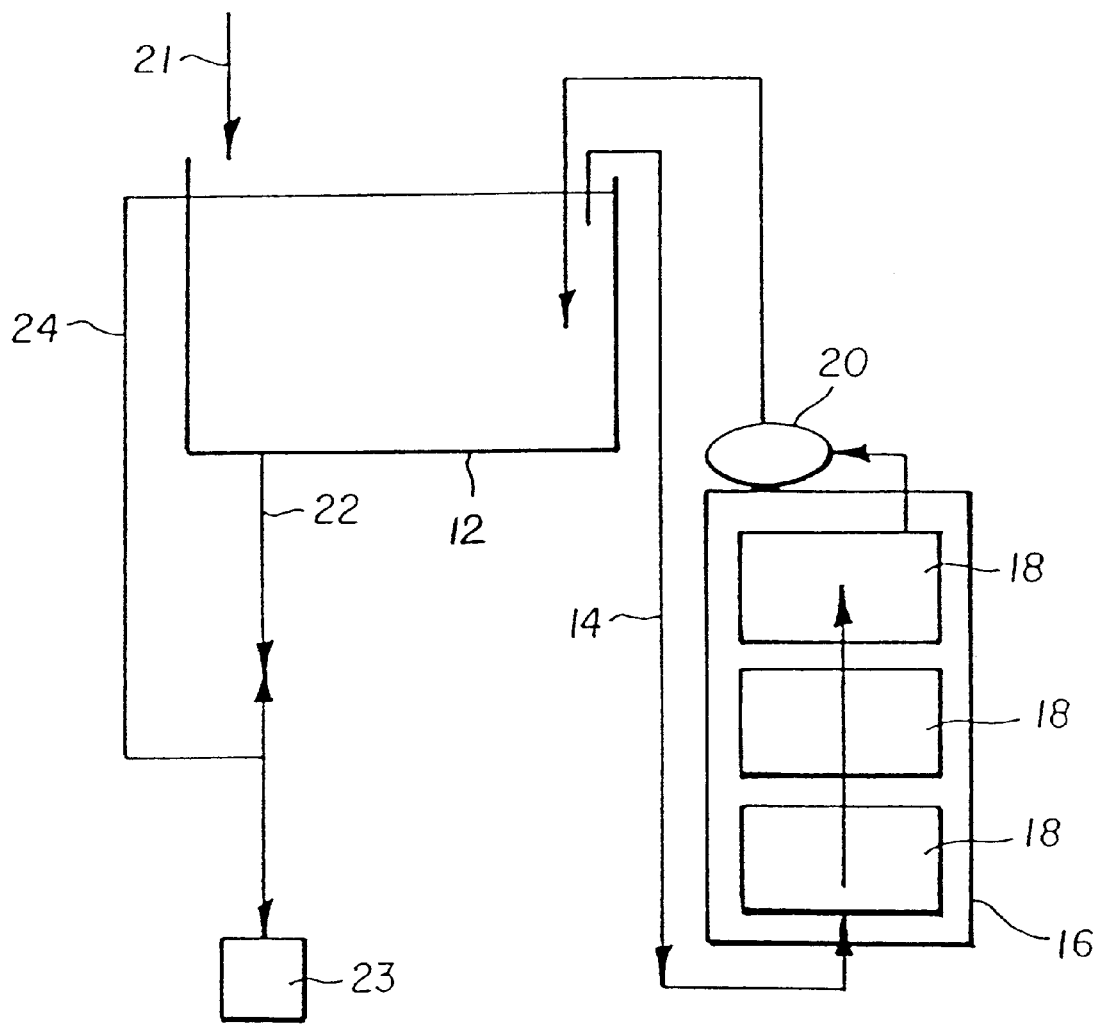
FIG. 1 is a diagram representing an equipment to perform the method of the invention.

The aluminosilicate polymer bearing SH or —S(CH$_2$)$_n$S— functions preferably takes the form of a hydrophilic gel that is porous and stable over the pH range it will be used in, i.e., between pH 7 and pH 13. Optimally, this polymer will remain permeable to the developer at the latter's pH without clogging as it absorbs the silver.

The organic inorganic aluminosilicate polymer used in the invention can be obtained from any aluminosilicate that has active hydroxyl groups on its surface. For example phyllosilicates such as imogolite can be used as the starting aluminosilicate. In one embodiment of the invention, the aluminosilicate is in fiber form, and active hydroxyl groups are located on the surface of these fibers. When an alkylalkoxysilane is hydrolysed in the presence of an inorganic aluminosilicate polymer having active surface hydroxyl groups, then the alkoxy groups of the alkylalkoxysilane react with the hydroxyl groups of the aluminosilicate to form covalent bonds. If the alkylalkoxysilane has SH or —S(CH$_2$)$_n$S— functions, then the organic-inorganic polymer used in this invention is obtained. In other words, surface SH or —S(CH$_2$)$_n$—S functions are introduced in the aluminosilicate polymers by hydrolyzing mercaptoalkyl alkoxysilanes of formula HSR$^1$SiR$^2_x$(OR$^3$)$_{3-x}$ wherein x is 0,1 or 2, R$^1$ is an alkylene group, R$^2$ is alkyl, aryl, aralkyle or alkaryle and R$^3$ is lower alkyl, in the presence of the aluminosilicate polymer. According to an embodiment, the mercaptoalkylalkoxysilane has the formula HS—(CH$_2$)$_m$—SiR$^2_x$(OR$^3$)$_{3-x}$ in which m is at least 1, R$^2$, R$^3$ and x are as previously defined. Preferably, m is between 1 and 4. Preferably, R$^2$ is an alkyl group having from 1 to 4 carbon atoms.

Mercaptoalkylalkoxysilanes that can be used in this invention are for example 3-mercaptopropyltrimethoxysilane, 3-mercaptopropyltriethoxysilane, 3-mercaptopropylmethyldimethoxysilane, (mercaptomethyl)methyidiethoxysilane, (mercaptomethyl)dimethylethoxysilane.

In the scope of this invention, it is also possible to react the aluminosilicate polymer with alkylalkoxysilanes that contain an organic radical with an —S—S— function such as for example:

bis[3(triethoxysilyl)propyl]tetrasulfide, [(C$_2$H$_5$O)$_3$SiCH$_2$CH$_2$CH$_2$—S—S]$_2$. It is also possible to use alkylalkoxysilanes with a crown ether organic radical containing an —S—S— or —S(—CH$_2$)$_n$—S— function, with n between 1 and 4.

When a phyllosilicate is used as the starting inorganic aluminosilicate polymer, the hydrolysis of the alkylalkoxysilane is performed at a pH higher than 7. Such a pH is obtained by addition of a base to the reaction medium, for example NH$_4$OH, NaOH or KOH. A pH higher than 7 allows the phyllosilicate to gel.

In addition to the alkylalkoxysilane described previously, it is possible to add to the aluminosilicate an alkylalkoxysilane modified by another non-hydrolysable organic radical. By an appropriate choice of organic radical, the properties of the organic-inorganic polymers used in this invention can be modified to increase their efficiency. For example it is possible to add an alkylalkoxysilane in which the alkyl group is a haloalkyl. In this case, the polymer used in the invention can bear on its surface an organic radical that can be halogenated such as bromoalkyl or chloroalkyl. For example, the use of bromopopyltrimethoxy silane increases the efficiency of the polymer for the extraction of silver in developers according to this invention.

In a preferred embodiment, the polymer used in the invention is obtained from imogolite-type aluminosilicate. Imogolite is an aluminosilicate polymer that forms fibers or spindles with active hydroxyl groups on its outer surface. Imogolite is naturally-occurring; it was first described by Wada in J. Soil Sci. 1979, 30(2), 347–355. Imogolite can also be synthesized by various methods. Examples of syntheses are described in U.S. Pat. No. 4,252,779, U.S. Pat.

No. 4,241,035, U.S. Pat. No. 4,152,404. A method providing a synthetic pure imogolite is described in U.S. Pat. No. 5,888,711. In a preferred embodiment, the imogolite takes the form of an aqueous gel.

To perform the silver extraction method of the invention, it may be suitable to set up the organic-inorganic polymer.

This setting-up, readily achieved by those skilled in the art, must serve to optimize the contact between the organic-inorganic polymer and the developer to be treated.

When a phyllosilicate such as imogolite in gel form is used as the inorganic polymer, this will preferably contain between 1.5 g and 8 g (Al+Si) per liter. Below 1.5 g, the gel may not be sufficiently textured. Above 8 g, it becomes too thick.

In one embodiment of the invention, the organic-inorganic polymer in gel form is placed in a container that is permeable to the effluent, for example a dialysis bag, made for example of polypropylene, polyethylene, cellulose material, filter material or non-woven textile material.

The inorganic polymer can then be formed in the presence of glass beads or fibers. The polymer is thus formed on the surface of these beads or fibers, which optimizes the area of contact it makes with the effluent. In this case the organic-inorganic polymer can be used either as it is, or placed in a permeable container.

The diagram in FIG. 1 describes schematically an equipment to perform the method of the invention. This diagram represents a developing tank 12 containing a developing bath. The tank is fitted with an inlet for fresh developer or water 21, an drain outlet 22 and an overflow outlet 24. The developer flows through a pipe 14 to a treatment cartridge 16 that contains one or more containers 18 that are permeable to the developer, and which contain the organic-inorganic polymer. The solution from the cartridge outlet is fed back by a pump 20 into the tank 12 where it is further used for the development of photographic products.

The developer recovered at the overflow outlet 24 or the drain outlet 22 can be treated with a complementary treatment device 23, which can be a hydrotalcite cartridge, a nanofiltration device or an ion exchange resin. At the outlet from the device 23 the spent developer can be run off into the sewers or be recycled.

In one embodiment, it is possible to incorporate into the aluminosilicate polymer used in the invention a complexing agent that is released to form a complex salt with silver. This complexing agent complexes the silver present when it is released into the developer. The silver complex thus formed is then trapped by the SH or $-S(CH_2)_nS-$ functions the aluminosilicate polymer. The complexing agent is thereby regenerated and can serve to trap further silver atoms present in the developer. Suitable complexing agents include thiols and in particular heterocyclic thiols, for example mercaptobenzimidazoles, mercaptobenzothiazoles, triazole-thiols, mercaptotetrazoles, imidazoline-thiones, mercapto-carboxylic acids, and mercaptobenzoxazoles. The released complexing agent is preferably used when the aluminosilicate polymer used in the invention is in gel form. This gel will preferably be an imogolite gel.

For example, it is possible to incorporate between 10 g and 300 g of thiol per kg of aluminosilicate polymer gel containing 3 g Al+Si per liter. The quantity of thiol that can be incorporated in the polymer gel depends on its texture and so on the quantity of Al+Si per liter.

The method of the invention is applicable to all photographic silver halide developers, especially to high pH black-and-white developers, for example for X-ray or graphic arts materials, or color developers for color photography. One unexpected feature of the present invention is the possibility to use the modified organic-inorganic aluminosilicate polymer in a solution having a high pH of 12 or more while the covalent bonds formed between the mercaptoalkylalkoxysilane and the starting aluminosilicate polymer are not affected by this high pH. The developers contain the usual developing agents of the hydroquinone, phenidone (1-phenyl-3pyrazolidone), para-aminophenol, ascorbic acid, or paraphenylenediamine types. These developing agents and developers are described in Research Disclosure, September 1994, publication 36544, chapter XIX, page 536, and in Chimie et Physique Photographiques, P. Glafiudès, $5^{th}$ edition, pages 99 et seq., and 947 et seq.

EXAMPLE 1

Preparation of the Aluminosilicate Polymer

To 1000 ml of deionized water were added 16.7 mmoles of tetraethylorthosilicate $Si(OR)_4$. The reaction mixture was stirred at ambient temperature for one hour and then added to 31.2 mmoles of $AlCl_3.6H_2O$ dissolved in 1000 ml of pure water. The resulting mixture was stirred for 20 minutes, and the pH was adjusted to 4.5 with 1M NaOH. The solution became turbid. When the solution had cleared 1M NaOH was added until a pH of 6.8 was reached. A white gel was obtained, which was centrifuged for 20 minutes at 2000 rpm. This gel was taken up and redissolved in 5 ml of a mixture of 1M hydrochloric acid and 2M acetic acid. The volume was made up to 2 liters with water. This solution contained 30 mmoles of Al, 16.6 mmoles of Si, 5 mmoles of HCl and 10 mmoles of acetic acid. The solution was stored at 5° C.

This solution was then diluted with deionized water to obtain an Al concentration of 10 mmoles per liter. The dilute solution was heated for 5 days at 96° C., and then filtered through an ultrafiltration membrane with a separating power of 10,000 Daltons (membrane supplied by AMICON). This yielded a limpid solution of imogolite-type aluminosilicate polymer described in U.S. Pat. No. 5,888,711 containing Al and Si in an Al:Si ratio of 1.8.

To 20 ml of this solution containing 2.5 g/l of(Al+Si) was added a solution of 3-mercaptopropyltrimethoxysilane in anhydrous methanol ($10^{-3}$ moles in 2 ml of methanol) containing a few drops of $NH_4OH$. The solution gelled (pH>7) and then gradually hydrolysed.

The infra-red spectrum of the alkylalkoxysilane before hydrolysis showed a band at 1087 $cm^{-1}$ characteristic of the Si—O bond. The infra-red spectrum of alkylalkoxysilane hydrolysed alone showed a splitting of the band characteristic of the Si—O bond (bands at 1099.7 and 1042.8 $cm^{-1}$), indicating the formation of polysiloxane by hydrolysis. The infra-red spectrum of the aluminosilicate hydrolysed in the presence of alkylalkoxysilane also showed a splitting of the band characteristic of the Si—O bond, indicating that the hydrolysis had taken place. However, these bands were shifted relative to the spectrum of the alkylalkoxysilane (1126.8 and 1035.6 $cm^{-1}$). This shift of the bands showed that the polymer obtained was not a polysiloxane, but that the siloxane had been grafted onto the aluminosilicate polymer by hydrolysis. Also, the infra-red spectrum of the product of the invention showed that the organic part was not affected by this graft and so remained available for trapping of the silver. Comparison of these spectra clearly showed the structure of the polymer.

EXAMPLE 2

A set-up such as that represented diagrammatically in FIG. 1 was used. The tank 12 was part of a processing line for Graphic Arts products (not shown), and contained a seasoned Kodak RA-2000 Graphic Arts developer with the following composition:

| | |
|---|---|
| 21.1 g/l | hydroquinone |
| 12.5 g/l | potassium hydroquinone monosulfate |
| 0.7 g/l | 4-methyl-4-hydroxymethyl-1-phenyl-3-pyrazolidone (HMMP) |
| 0.2 g/l | benzotriazole |
| 0.01 g/l | phenylmercaptotetrazole |
| 4.70 g/l | sodium bromide |
| 54.4 g/l | sodium sulfite |
| pH | 10.3 |

This developer was seasoned, i.e., it had been used, and it contained 0.11 mg/l of silver derived from the development of photographic products. The developer was sent through the pipe 14 to the cartridge 16 in which was placed a container 18 with 100 mg of the polymer prepared in Example 1. The walls of this container 18 were permeable to the developer. After flowing through the cartridge 16 the developer was fed back to the tank 12. The flow rate in this circulation loop was 0.5 liters per minute. The quantity of silver was measured by inductively coupled plasma mass spectrometry (ICPMS) after circulation of each liter of developer. No trace of silver was detected. The concentration of none of the main constituents of the developer was modified.

EXAMPLE 3

Into the tank was placed 3 liters of a seasoned Graphic Arts developer with the same composition as in Example 2, except that this developer contained 0.8 mg of silver per liter. In the developer was placed a bag made of a polypropylene envelope containing 100 mg of the polymer prepared in Example 1. The silver concentration was measured at regular intervals by ICPMS.

The following results were obtained:

TABLE

| Contact time | Concentration of Ag in mg/l |
|---|---|
| ½ h | 0.4 |
| 4 h | 0.2 |
| 12 h | 0.03 |

The concentration of none of the other organic or inorganic constituents of the developer was modified.

What is claimed is:

1. Method to extract the metallic silver present in an aqueous photographic silver halide developer as a result of silver halide development, comprising the step of placing said developer in contact with an aluminosilicate polymer bearing on its surface organic radicals with functions selected in the group consisting of SH and —S(CH$_2$)$_n$S— functions, where n is an integer from 1 to 4.

2. Method according to claim 1, wherein said polymer takes the form of a hydrophilic porous gel.

3. Method according to claim 1, wherein said developer circulates in a loop that includes a developing tank and a cartridge containing said polymer.

4. Method according to claim 1, wherein said polymer is contained in a bag with walls permeable to said developer, said bag being immersed in the developer.

5. Method according to claim 1, wherein said polymer contains a silver complexing agent absorbed on it that is released into said developer.

6. Method according to claim 5, wherein said silver complexing agent released into the developer is a thiol.

7. Method according to claim 6, wherein said silver complexing agent released into the developer is a heterocyclic thiol, for example a mercapto-azole.

8. Method according to claim 1, wherein said polymer is an imogolite modified by reaction with an ormosyl of formula:

HS—R$^1$—Si—R$^2_x$(OR$^3$)$_{3-x}$, where R$^1$ is alkylene, R$^2$ is an alkyl, aryl, aralkyl or alkaryl group and R$^3$ is a lower alkyl group.

9. Method according to claim 1, wherein said developer contains at least one developing agent selected in the class of agents comprising hydroquinone, phenidone and their derivatives, p-aminophenols, p-phenylenediamines, ascorbic acid derivatives, and inorganic developers.

10. Product comprising (i) an aluminosilicate polymer, said polymer bearing on its surface organic radicals with functions selected in the class consisting of SH and —S(CH$_2$)$_n$S— functions where n is an integer from 11 to 14, and (ii) a silver complexing agent that is released into an aqueous developer for silver halide photographic products.

* * * * *